(12) United States Patent
Lee et al.

(10) Patent No.: US 11,050,695 B1
(45) Date of Patent: *Jun. 29, 2021

(54) TECHNIQUES FOR TEMPLATED MESSAGES

(71) Applicant: WhatsApp Inc., Menlo Park, CA (US)

(72) Inventors: Vicki Wancheng Lee, Palo Alto, CA (US); Christopher Julian Peiffer, Woodside, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,534

(22) Filed: Nov. 20, 2019

Related U.S. Application Data

(63) Continuation of application No. 15/471,653, filed on Mar. 28, 2017, now Pat. No. 10,547,577.

(51) Int. Cl.
*G06F 15/16* (2006.01)
*H04L 12/58* (2006.01)
*G06F 40/58* (2020.01)
*G06F 40/186* (2020.01)

(52) U.S. Cl.
CPC .......... *H04L 51/063* (2013.01); *G06F 40/186* (2020.01); *G06F 40/58* (2020.01); *H04L 51/066* (2013.01); *H04L 51/20* (2013.01)

(58) Field of Classification Search
CPC ..... H04L 51/063; H04L 51/20; H04L 51/066; H04L 51/00; H04L 51/04; H04L 51/32; H04L 51/18; G06F 40/58; G06F 40/186; G06Q 10/107

USPC ......................................... 709/206, 207, 246
See application file for complete search history.

(56) References Cited

U.S. PATENT DOCUMENTS

| | | | | |
|---|---|---|---|---|
| 2010/0285775 | A1* | 11/2010 | Klein | H04L 63/08 455/411 |
| 2013/0007143 | A1* | 1/2013 | Rinard | G06Q 10/107 709/206 |
| 2013/0024524 | A1* | 1/2013 | Graff | G06Q 10/107 709/206 |
| 2013/0185051 | A1* | 7/2013 | Buryak | G06F 40/58 704/2 |
| 2016/0087925 | A1* | 3/2016 | Kalavagattu | H04L 43/10 709/206 |
| 2016/0294748 | A1* | 10/2016 | Yang | G06Q 50/01 |

* cited by examiner

*Primary Examiner* — Johnny B Aguiar
(74) *Attorney, Agent, or Firm* — Kacvinsky Daisak Bluni PLLC

(57) ABSTRACT

Techniques for templated messages are described. In one embodiment, an apparatus may comprise a messaging component operative to receive a templated-message package at a client, the templated-message package comprising a message-template identifier and one or more parameters; retrieve a message template based on the message-template identifier; and generate a templated message based on the retrieved message template and the one or more parameters; and a user interface component operative to display the templated message in the client. Other embodiments are described and claimed.

14 Claims, 13 Drawing Sheets

*Templated-Message System 100*

*800*

```
┌─────────────────────────────────────────────────┐
│ Receive a templated-message package at a client,│
│ the templated-message package comprising a      │
│ message-template identifier and one or more     │
│ parameters.                                     │
│                      802                        │
└─────────────────────────────────────────────────┘
                        │
┌─────────────────────────────────────────────────┐
│ Retrieve a message template based on the        │
│ message-template identifier.                    │
│                      804                        │
└─────────────────────────────────────────────────┘
                        │
┌─────────────────────────────────────────────────┐
│ Generate a templated message based on the       │
│ retrieved message template and the one or more  │
│ parameters.                                     │
│                      806                        │
└─────────────────────────────────────────────────┘
                        │
┌─────────────────────────────────────────────────┐
│ Display the templated message in the client.    │
│                      808                        │
└─────────────────────────────────────────────────┘
```

*FIG. 8*

TECHNIQUES FOR TEMPLATED MESSAGES

RELATED APPLICATIONS

This application is a continuation of and claims the benefit of priority to U.S. patent application Ser. No. 15/471,653, titled "TECHNIQUES FOR TEMPLATED MESSAGES," filed on Mar. 28, 2017, which is incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for templated messages. Some embodiments are particularly directed to techniques for regional and language localization for templated messages. In one embodiment, for example, an apparatus may comprise a messaging component operative to receive a templated-message package at a client, the templated-message package comprising a message-template identifier and one or more parameters; retrieve a message template based on the message-template identifier; and generate a templated message based on the retrieved message template and the one or more parameters; and a user interface component operative to display the templated message in the client. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates an embodiment of a logic flow for the system of FIG. 1.

DETAILED DESCRIPTION

Figure 1:
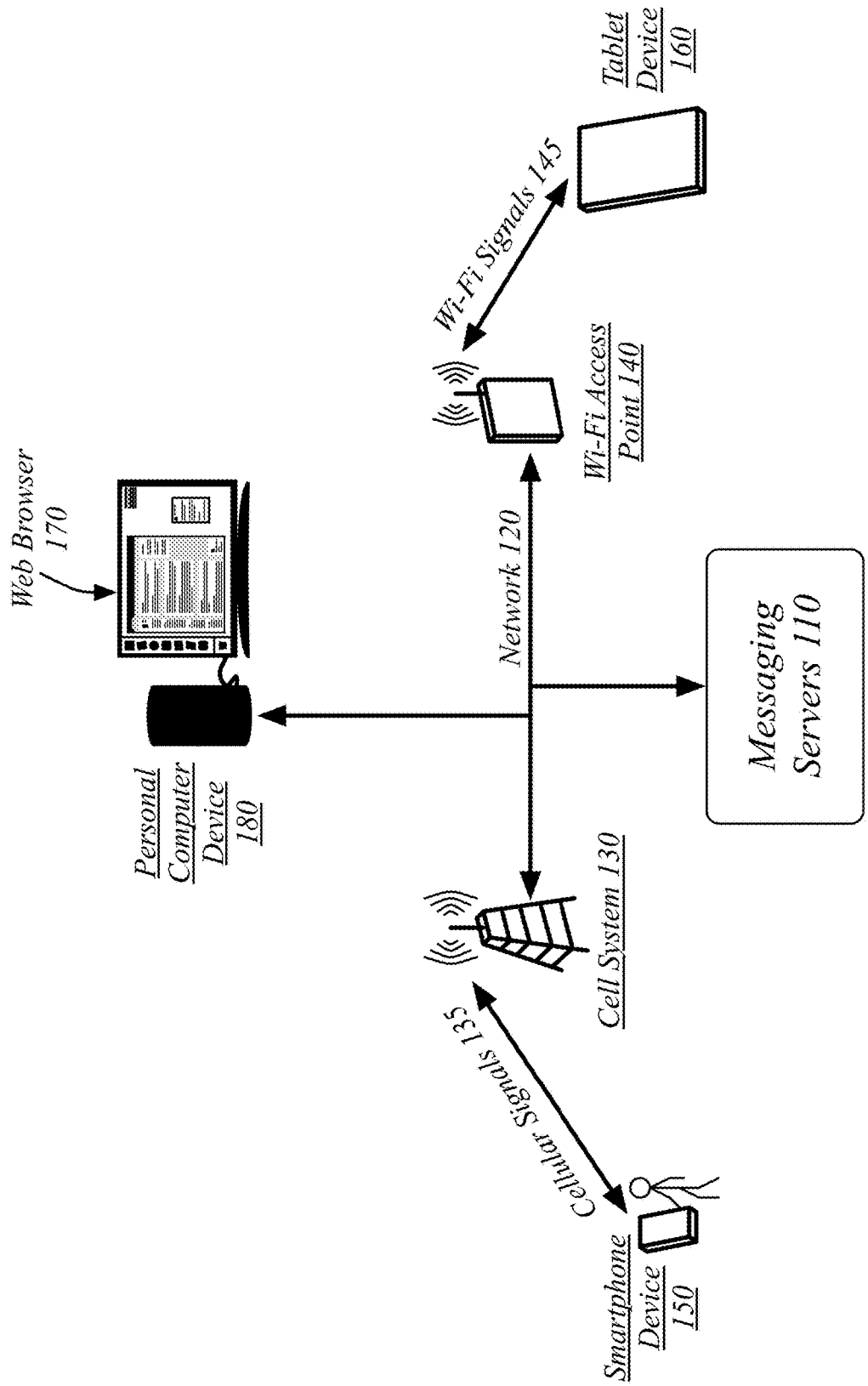
FIG. 1 illustrates an embodiment of a templated-message system.

A messaging system may support a message type where the payload of the message carries a reference to a layer of commonly-agreed verbal structure: a templated message. A server acts as a repository and broker of these structures, making them available to senders and recipients. Senders can apply these structures to their messages. Recipients can verify that received messages use these structures.

The use of standardized templates can apply a uniform look to communication, which may be particularly useful in business communication to apply a professional feel. Further, there may be less chance for spam and honest mistakes by predetermining appropriates types of messages for use in business communication. There can be improved regulatory compliance by front-loading the analysis of regulatory demands into the creation of the template structures.

Further, localization may be applied wherein a particular template structure is replicated into different localized versions. Localization may be performed to use a language that is appropriate to the receiver. Localization may be performed to conform to regional standards, such as for the format for date and time or to use the appropriate local currency.

This system of templated messages may empower localization even where end-to-end encryption is used between the sender and the receiver. A messaging server system that is secured against examining the contents of messages is prevented from performing automatic translation of message contents. Similarly, a messaging server system that is secured against examining the contents of messages is prevented from performing an analysis of the contents to detect and prevent spam or otherwise unwanted messages. The use of templated messages may therefore allow for localization and message quality management through the curation of the message templates.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a templated-message system 100. In one embodiment, the templated-message system 100 may comprise a computer-implemented system having software applications comprising one or more components. Although the templated-message system 100 shown in FIG. 1 has a limited number of elements in a certain topology, it may be appreciated that the templated-message system 100 may include more or less elements in alternate topologies as desired for a given implementation.

Messaging servers 110 may comprise one or more messaging servers operated by a messaging platform as part of a messaging system. A messaging server may comprise an Internet-accessible server, with the network 120 connecting the various devices of the messaging system comprising, at least in part, the Internet. A messaging system may use the messaging servers 110 to support messaging for various user client devices.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

Messaging interactions may use end-to-end encrypted communication between client devices. A sending client device may encrypt an outgoing message using security techniques that establish one of only the receiving device being able to decrypt the outgoing message (e.g., by using public-key cryptography) or only the sending and receiving devices being able to decrypt the outgoing message (e.g., by using shared-key cryptography). In these embodiments, the servers of the messaging system may be prevented from decrypting messages being sent between clients. However, in other embodiments, while encrypted communication may be used between the client devices and server devices, the messaging server devices may be empowered to examine the contents of user messages. Such examination may be used to provide services to the users of the messaging system. In some embodiments, users may be empowered to select whether a particular message thread uses end-to-end encryption (and thereby receive the additional privacy of the messaging servers being prevented from examining the contents of messages) or doesn't (and thereby receive the benefit of the messaging system being able to programmatically examine messages and offer relevant services to the users).

The messaging system may use knowledge generated from interactions in between users. The messaging system may comprise a component of a social-networking system and may use knowledge generated from the broader interactions of the social-networking system. As such, to protect the privacy of the users of the messaging system and the larger social-networking system, messaging system may include an authorization server (or other suitable component(s)) that allows users to opt in to or opt out of having their actions logged by the messaging system or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system and other elements of a social-networking system through blocking, data hashing, anonymization, or other suitable techniques as appropriate.

Figure 2:
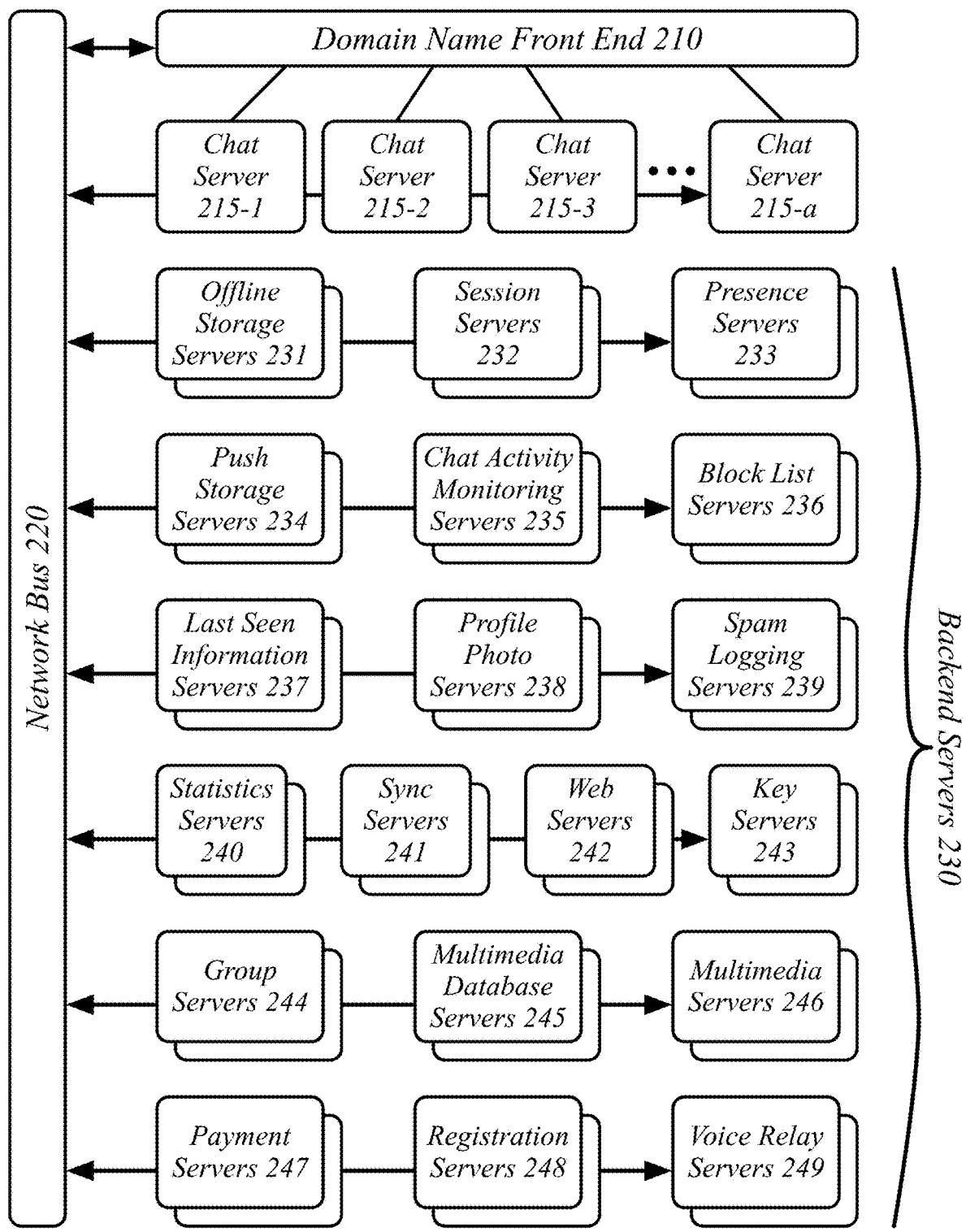
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the templated-message system 100 with the operations of the templated-message system 100 comprising a portion of the overall operations of the messaging system 200. The illustrated embodiment of the messaging system 200 may particularly correspond to a portion of the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the templated-message system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
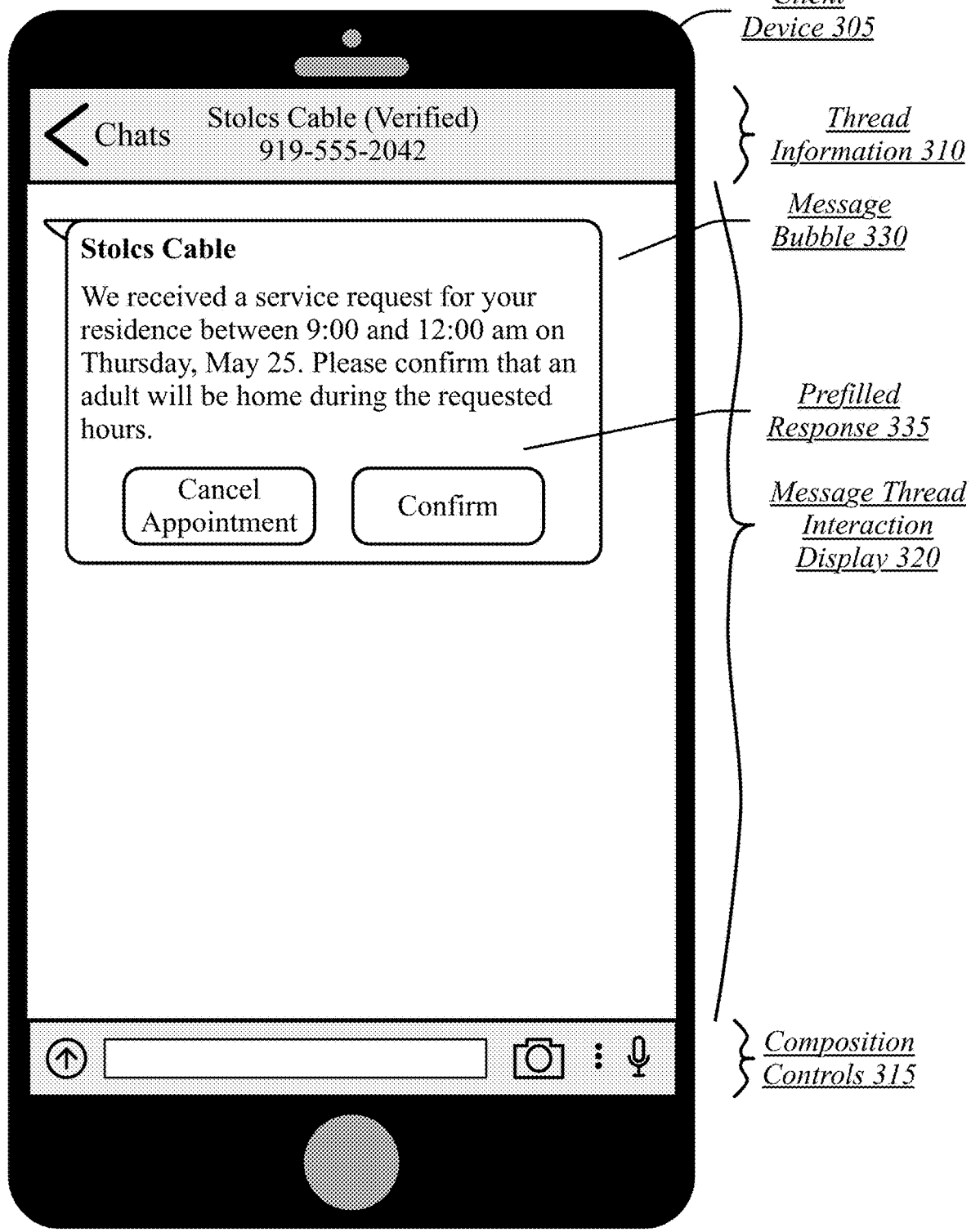
FIG. 3 illustrates an embodiment of a user interface for a templated message.

FIG. 3 illustrates an embodiment of a user interface 300 for a templated message.

The user interface 300 may comprise a user interface for a message thread displayed on a client device 305. At least a portion of the message exchange for the message thread may be displayed in a message thread interaction display 320. A message thread interaction display 320 may comprise a display of one or more messages exchanged by the users of the message thread. The features discussed with regards to a message thread may be applied to either one-on-one message threads or group message threads. The features discussed with regards to a message thread may be applied to a message thread in which a user engages with a business entity.

The user interface 300 may include a display of thread information 310. The thread information 310 may comprise a listing of one or more other users involved in the thread. A display of the one or more other users may use the name of a user, such as a full name, short name, or other name registered as the name for use with a particular user for messaging and/or social-networking interactions. A display of the one or more other users may use an avatar, profile picture, or other visual representation of the one or more other users.

In some instances, a displayed name for a user may comprised a verified name for an enterprise entity. A verified name is a name that has been verified by a managing authority, such as the maintainer of the messaging system, to correspond to an entity. Where a verified name is known for a user, such as a business entity, the verified name may be displayed as part of the thread information 310. However, in some embodiments, the display of a user name may normally be associated as a user interface feature with drawing the name of the user from an address book on the client device 305. As such, a verified name may be displayed with a visual signifier indicating that the name displayed for the user is a verified name according to the managing authority and not a locally-defined name drawn from a viewing user's address book.

The user interface 300 for a message thread may include composition controls 315 that are persistently visible during the display of a message thread. Many, most, or nearly all of the composition controls 315 may empower access to further user interface controls for the performance of various tasks, such as text entry, media selection, emoji selection, camera use, a social approval icon, etc.

Each of the one or more messages may be represented by a particular message bubble, such as message bubble 330. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from a background of a message thread interaction display. A message bubble may have a distinctly-colored border, such as a black outline as depicted, or may have a border defined by the interface between differing colors of the message bubble and the background. In some embodiments, the color or colors of either or both the message bubbles and the background may be customized and configured by users of the messaging system.

A received message, and therefore a displayed message bubble 330, may include a prefilled response 335 or a plurality of prefilled responses. A prefilled response 335 is a sender-defined or template-defined sender-selected response made available to a user for responding to a message. The use of prefilled responses may ease a user's experience in responding to a received message by providing appropriate responses that can be sent as a reply to the sender with a simple selection of the desired response. Similarly, the use of prefilled responses may ease the entity providing the prefilled responses in interpreting a received response where the received response is of their suggested prefilled responses. Further, the reception of a user-selected prefilled response may be communicated with an identifier for the prefilled response, empowering the automated processing of the received user-selected prefilled response.

Figure 4:
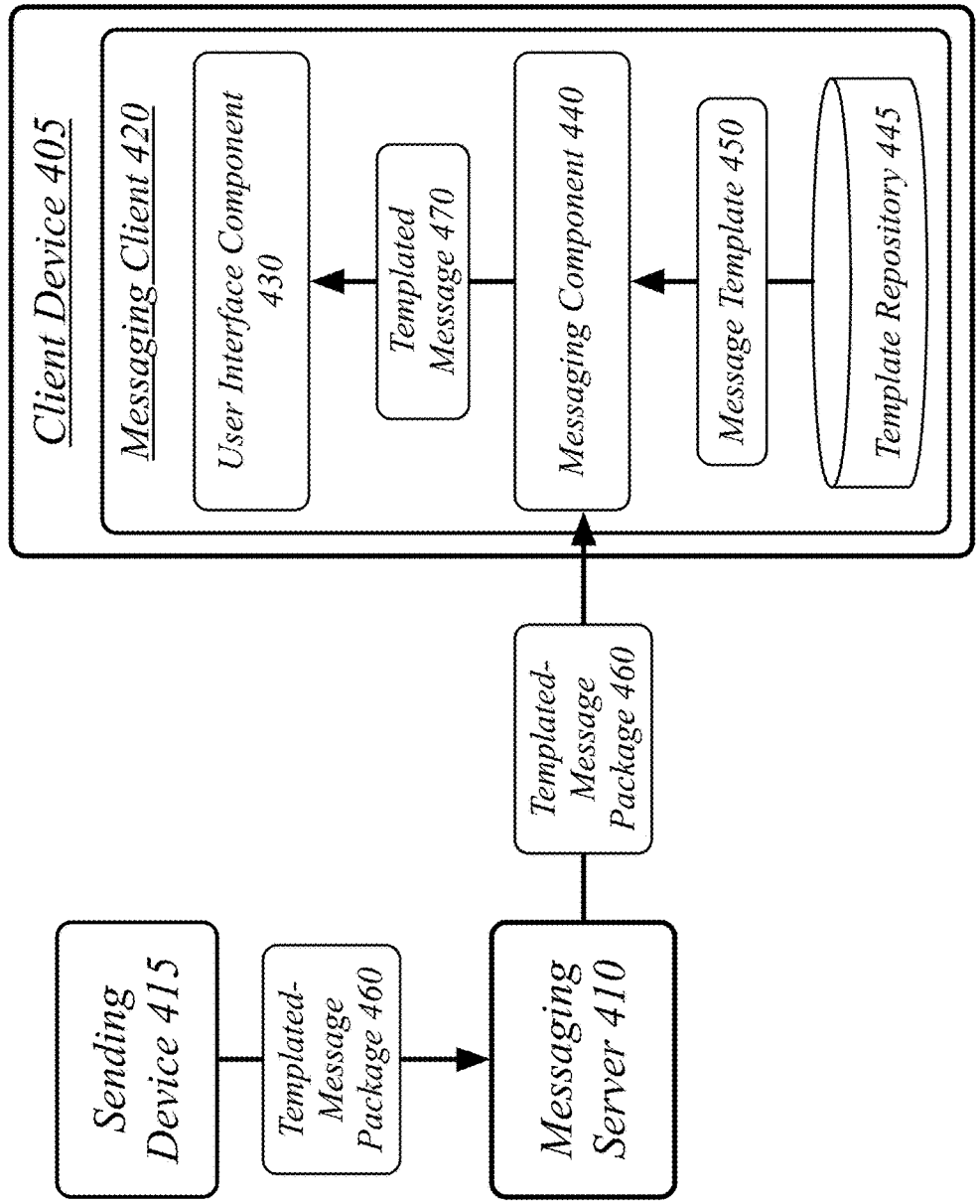
FIG. 4 illustrates a templated-message package being sent by a templated-message system to a client device.

FIG. 4 illustrates a templated-message package 460 being sent by a templated-message system 100 to a client device 405.

The client device 405 and sending device 415 may be two of a plurality of client devices communicating using a messaging system and implementing the templated-message system 100. The client device 405 executes a messaging client 420. The messaging client 420 on each device comprises a plurality of components. The plurality of components may comprise software components. The components of the messaging client 420 may include additional components to those described here and the operations of the messaging client 420 may be divided between components in different configurations in different embodiments. The sending device 415 may execute an enterprise messaging client. An enterprise messaging client may implement the messaging features of the messaging client 420 using interface features designed for use by enterprise users.

The messaging client 420 may comprise a messaging component 440. The messaging component 440 may be generally arranged to perform the interactions between the messaging client 420 and the messaging system. The messaging component 440 may send network communication to and receive network communication from a messaging server 410 for the messaging system.

The messaging client 420 may comprise a user interface component 430. The user interface component 430 may be generally arranged to present information to a user of a client device and receive user commands from the user of the client device. The user interface component 430 may display visual information, output audio information, and otherwise present information to a user. The user interface component 430 may receive touch commands, text commands, voice commands, and any other sort of command for the operation of the messaging client 420.

The sending device 415 sends a templated-message package 460 to the messaging client 420 on the client device 405. The templated-message package 460 comprises a message-template identifier and one or more parameters. The message-template identifier empowers the sender to direct the client device on the message language structure that should be used to display the message being sent by the sending device 415, including predefined text and the placement of the one or more parameters within the text.

The availability of the one or more parameters in a message template empowers the sender to customize the message template within a predefined portion of the message. The parameters of the message template allow the designation of particular elements to be included in the templated message. The parameters may allow for text to be specified, which text may have a defined maximum allowed length. The parameters may allow for an image to be specified. The parameters may generally specify that any sort of content is allowed to be included in the message.

The one or more parameters may comprise one or more localized parameters. A localized parameters is a parameter that is to be translated by the receiving client device 405 into an appropriate localized form with a region-specific localization. A localized parameter may comprise a currency parameter, wherein the currency parameter is designated for translation to a local currency. A localized parameter may comprise a date parameter, wherein the date parameter is designated for translation to a local date format. For example, different regions use different orderings for the constituent elements (month, day, year) of a date. Further, where a date is spelled out (e.g., "June" instead of "6"), the word for the month may be translated to a local language. A localized parameter may comprise a time parameter, wherein the time parameter is designated for translation to a local time format. As such, a localized parameter may be translated to a region-specific localization by being designated for translation.

The messaging server 410 receives the templated-message package 460 and performs a store-and-forward service to provide the templated-message package 460 to the client device 405. The messaging server 410 may determine the client device 405 to receive the templated-message package 460 based on device information for a designated receiving user.

The messaging component 440 of the messaging client 420 receives the templated-message package 460 from the sending device 415 via the messaging server 410. The templated-message package 460 may be decrypted where encrypted transport is used, such as end-to-end encryption. The templated-message package 460 include a message-template identifier and the message component 440 retrieves a message template 450 from a template repository 445 based on the message-template identifier. The template repository 445 is a local store on the client device 405 of message templates empowering retrieval of a message template 450 using the message-template identifier as an index on the message templates.

The messaging component 440 generates a templated message 470 based on the retrieved message template 450 and the one or more parameters. The message template 450 defines how the one or more parameters are to be included in the templates message 470 and are therefore combined with the elements of the message template 450 to generate the templated message 470. The templated message 470 is then passed to the user interface component 430, where the user interface component 430 then displays the templated message 470 in the messaging client 420. A templated message 470 may be displayed with a visual indicator indicating that it is a templated message 470, thereby verifying to the user to the displayed message is templated.

Figure 5:
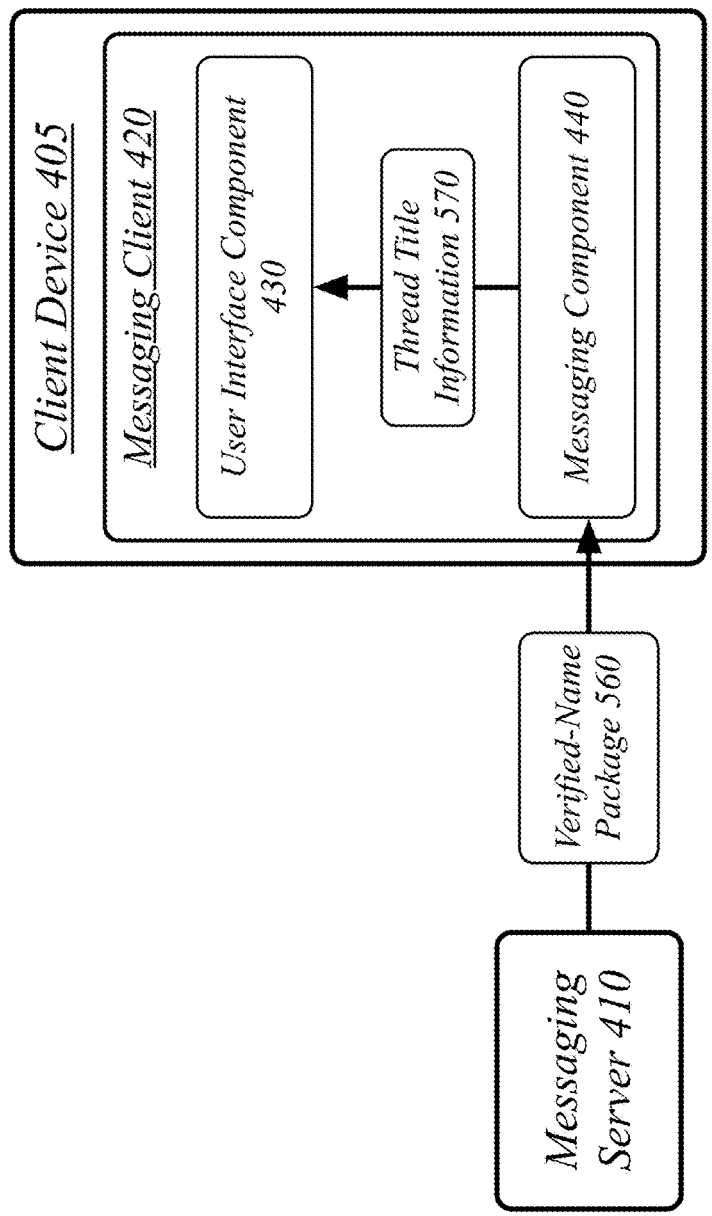
FIG. 5 illustrates an embodiment of a verified-name package being received at a client device.

FIG. 5 illustrates an embodiment of a verified-name package 560 being received at a client device 405.

A verified-name package 560 comprises a communication from the messaging system that a particular entity is known to the messaging system under a particular name. In general, this verification will indicate that a particular known messaging entity corresponds to a particular known business entity. This may provide user confidence in their messaging experience where, for example, the templated-message package 460 received by a user is sent by an enterprise entity.

Entities in the messaging system may be identified according to phone number. This may be useful where the messaging system is directed primarily to mobile devices that are associated with a phone number. However, the messaging system may still support clients on devices other than mobile devices with assigned phone numbers, such as where a sending device 415 executes on an enterprise system, with a phone number not being assigned specifically to the sending device 415 but instead being a phone number for the enterprise entity. For example, a business may employ multiple enterprise clients and use a common contact phone number for the business as the associated phone number for each of the enterprise clients. The enterprise entity is therefore identified by an enterprise phone number without the sending device 415 being uniquely associated with the enterprise phone number, in contrast to the client device 405 which may be uniquely associated with its client phone number.

The messaging component 440 may receive a verified-name package 560 from a messaging system. The verified-name package 560 identifies a verified-name for an enterprise entity based on the phone number. The verified-name package 560 indicates that a particular phone number should be identified on the client device 405 as being associated with the enterprise entity, such as by displaying a name for the enterprise entity in a user interface on the client device 405 for a message thread in which a templated message is displayed.

In some cases, the templated-message package 560 may be received in response to a communication initiation by the client. For instance, the client device 405 may be used to retrieve a resource indicator for an enterprise entity. The resource indicator may be a uniform resource indicator (URI) that identifies both an application for processing the URI and provides address information. A URI may be activated by a user by selecting a link or other control embedded in a web page. The address information may comprise a phone number for the enterprise entity. As such, a communication initiation initiated may be based on a resource indicator comprising the phone number for the enterprise entity. The verified name may therefore ease the process for a user of initiating contact with a business by automatically configuring the display of identifying information for the business.

Alternatively, in some cases, an enterprise entity may reach out to the user based on, for example, having a phone number for a user that is a customer of the enterprise entity or that has otherwise provided their phone number to the enterprise entity. The verified name may therefore ease a user's concern as to who is reaching out to them by verifying that it is an identified entity.

Figure 6:
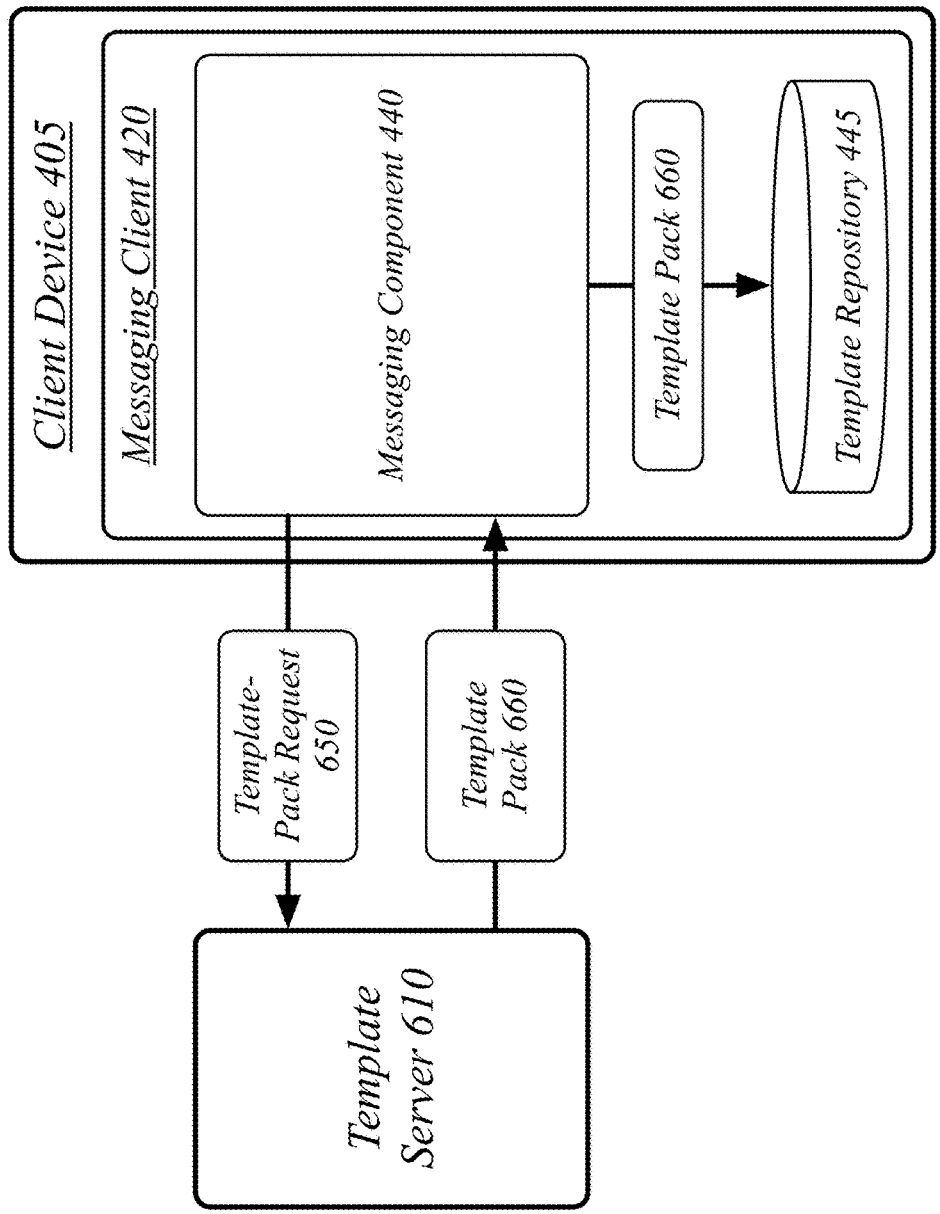
FIG. 6 illustrates an embodiment of a template-pack retrieval by a client device.

FIG. 6 illustrates an embodiment of a template-pack retrieval by a client device 405.

A template pack 660 collects together multiple message templates into a collection that can be distributed and referenced as a unit. The template pack 660 corresponds to a particular namespace for message-template identifiers, such that each message-template identifier uniquely identifies a message template within a particular template pack 660. The template pack 660 is identified by a template-namespace identifier and corresponds to a particular localization of the multiple message templates. As such, a template pack 660 can be retrieved that offers a localized version of message templates within a particular message-template namespace. A localized message template can therefore be uniquely identified through a combination of the template-namespace identifier, localization identifier, and message-template identifier. The template-namespace identifier and localization identifier uniquely identify the template pack

660, with the message-template identifier uniquely identifying the message template within the template pack 660. However, as a client device 405 will store at most one localization of a collection of message templates, the messaging client 420 will only use the namespace identifier and message-template identifier to retrieve a message template 450.

A received templated-message package 460 may therefore comprise a template-namespace identifier. The messaging component 440 uses the template-namespace identifier to retrieve the message template 450. However, the messaging component 440 may determine that the message template is not resident on the client device 405 and, in response, retrieve the templated-message package 460 from a template server 610. A template server 610 is a centralized repository of template packs for distribution to client devices.

The messaging component 440 sends a template-pack request 650 to the template server 610. The template-pack request 650 comprises a template-namespace identifier identifying the requested template pack 660. The messaging component 440 receives a template pack 660 in response to the template-pack request 650 from the template server 610 and stores the template pack 660 in the template repository 445. The messaging component 440 then retrieves the message template 450 from the template pack 660 based on the message-template identifier.

The template server 610 may identify the particular template pack 660 to provide to the client device 405 as appropriate to localization for the client device 405. The messaging client 420 may be associated with a preferred-language setting. The preferred-language setting specifies the languages preferred by the user of the client device 405. The preferred-language setting may be determined based on regional information for the user, such as the regional languages. The preferred-language setting may be determined based on a language setting for the operating system of the client device 405.

The preferred-language setting may comprise one or more preferred languages. Where multiple preferred languages are specified, the preferred languages may be ranked. For instance, a language setting for the operating system or messaging client 420 may be used as a most-preferred language, while regional languages are used as less-preferred languages that may still be acceptable to the user. One or more less-preferred languages may comprise fallback languages for the messaging client 420. For example, a client device 405 in Quebec may be set to have French as the most-preferred language, but indicate that English is a fallback language if a French language pack is not supported. It will be appreciated that languages may be further defined by region, such as a French-Canadian language pack as compared to a French-French language pack.

The template pack request 650 comprises the preferred-language setting. The received template pack 660 then comprises two or more message templates using one of the one or more preferred languages. The messaging client 420 then uses the received localized template pack 660 to display templated messages.

In some instances, a template pack retrieval may fail. When this happens, the messaging client 420 may report to the messaging system that a template pack retrieval has failed. The messaging system may report this failure to the sending device 415. The messaging system may, in particular, refrain from delivering a read receipt to the sending device 415 when a message cannot be displayed, and therefore read, due to a template pack retrieval failure.

Figure 7:
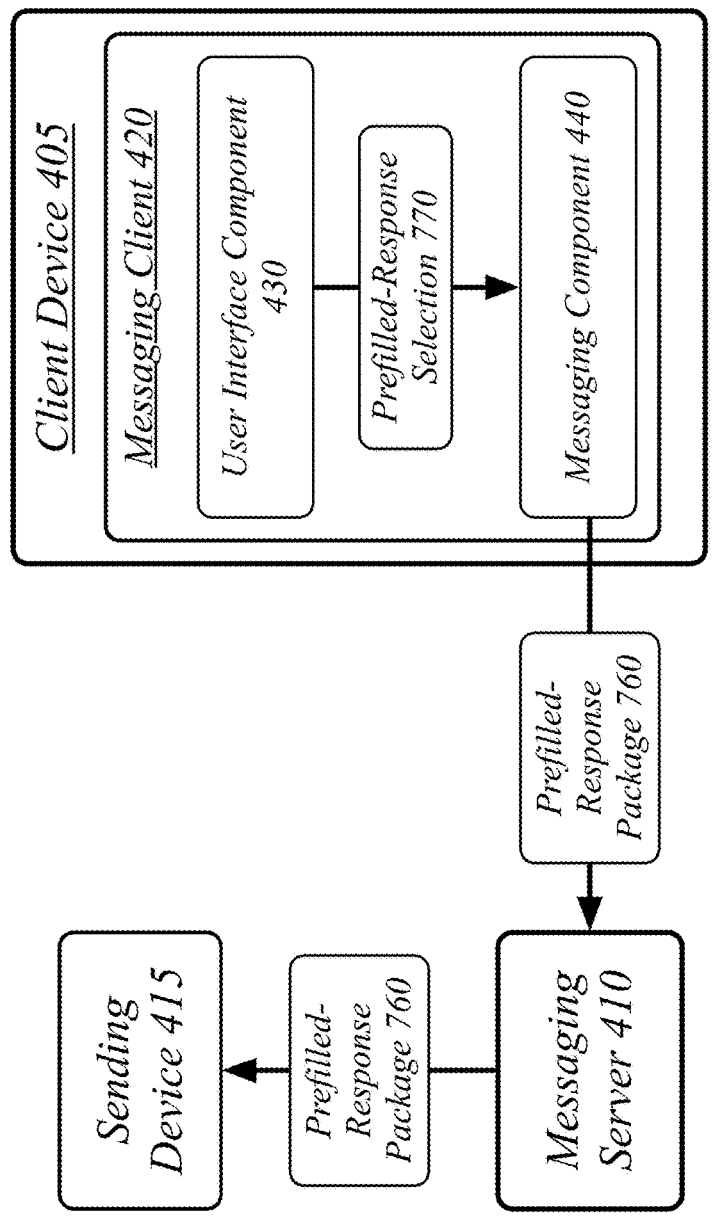
FIG. 7 illustrates an embodiment of a prefilled-response selection being sent to a sending device by the client device.

FIG. 7 illustrates an embodiment of a prefilled-response selection 570 being sent to a sending device 415 by the client device 405.

A templated-message package 460 may comprise one or more prefilled responses, providing easy-to-use responses to the user of the client device 405 in responding to the templated message 470. Each of the one or more prefilled responses corresponds to a prefilled-response identifier uniquely identifying a particular prefilled response within the context of the particular templated message 470.

The user interface component 430 displays the one or more prefilled responses in the user interface for the messaging client 420. The user interface component 430 may receive a prefilled-response selection by the user and may then notify the messaging component 440 that a user response has been specified based on the prefilled-response selection 770. The messaging component 440 then responds to the templated-message package 460 with a prefilled-response package 760. The prefilled-response package 760 comprises the message-template identifier and the prefilled-response identifier for the prefilled response selection 770. The messaging server 410 passes the prefilled-response package 760 to the sending device 415. The message-template identifier and the prefilled-response identifier can then be used by the sending device 415 to uniquely identify the prefilled response that was selected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may receive a templated-message package at a client, the templated-message package comprising a message-template identifier and one or more parameters at block 802.

The logic flow 800 may retrieve a message template based on the message-template identifier at block 804.

The logic flow 800 may generate a templated message based on the retrieved message template and the one or more parameters at block 806.

The logic flow 800 may display the templated message in the client at block 808.

The embodiments are not limited to this example.

Figure 9:
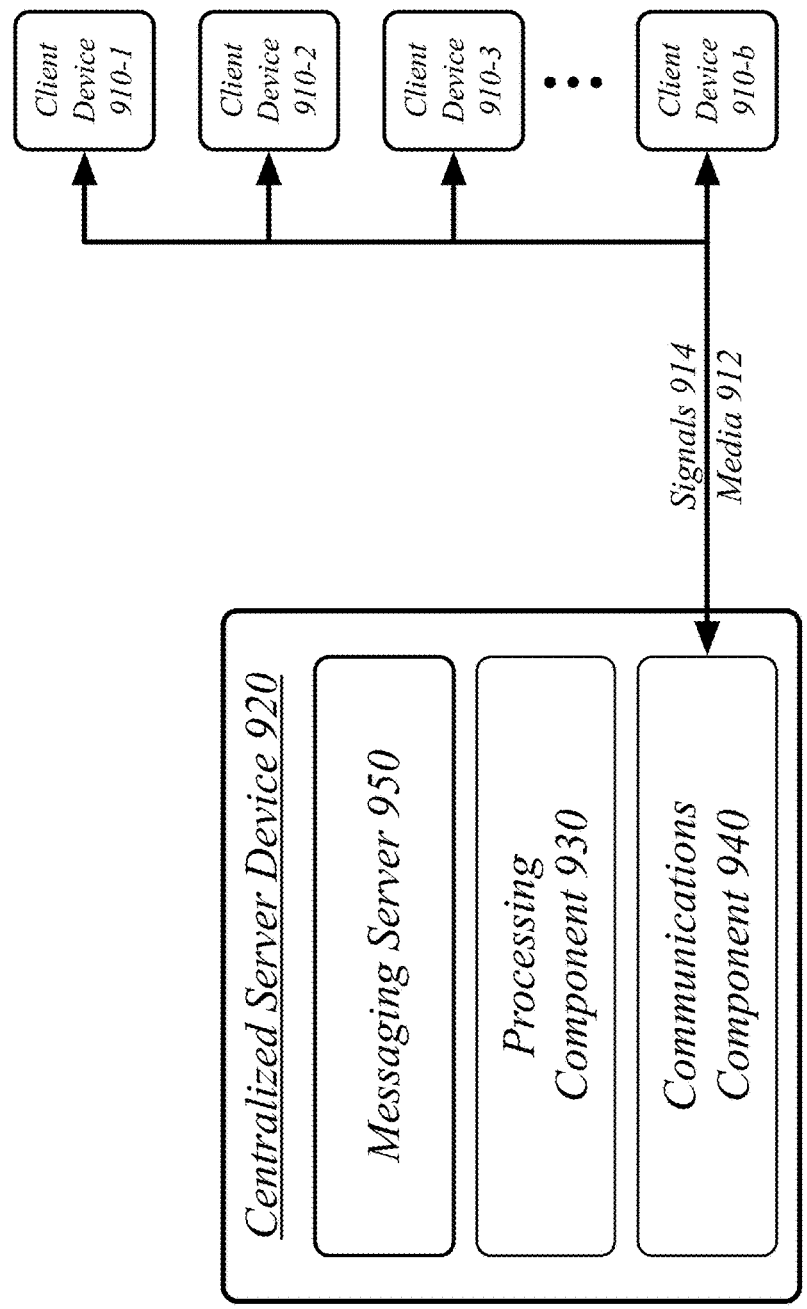
FIG. 9 illustrates an embodiment of a centralized system for the system of FIG. 1.

FIG. 9 illustrates a block diagram of a centralized system 900. The centralized system 900 may implement some or all of the structure and/or operations for the templated-message system 100 in a single computing entity, such as entirely within a single centralized server device 920.

The centralized server device 920 may comprise any electronic device capable of receiving, processing, and sending information for the templated-message system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 920 may execute processing operations or logic for the templated-message system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 920 may execute communications operations or logic for the templated-message system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 920 may communicate with other devices over a communications media 912 using communications signals 914 via the communications component 940. The devices may be internal or external to the centralized server device 920 as desired for a given implementation.

The centralized server device 920 may execute a messaging server 950. The messaging server 950 may comprise a messaging server for a messaging system 110. The messaging server 950 may provide messaging operations for a plurality of client devices 910, receiving and sending messages between the client devices 910. The client devices 910 may correspond to one or more of a smartphone device 150, tablet device 160, personal computer device 170, and/or any other client device.

Figure 10:
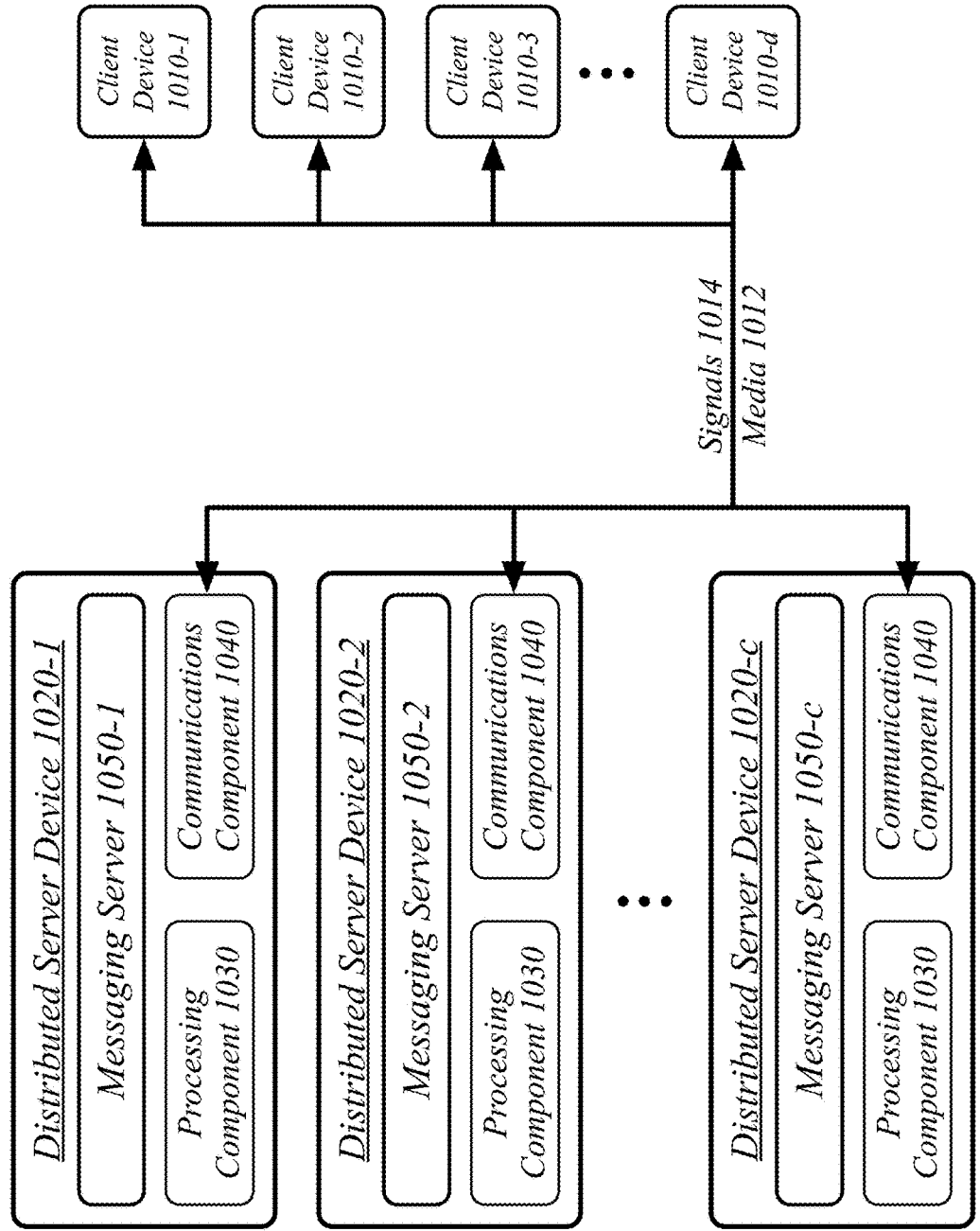
FIG. 10 illustrates an embodiment of a distributed system for the system of FIG. 1.

FIG. 10 illustrates a block diagram of a distributed system 1000. The distributed system 1000 may distribute portions of the structure and/or operations for the templated-message system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a plurality of distributed server devices 1020. In general, the distributed server devices 1020 may be the same or similar to the centralized server device 1020 as described with reference to FIG. 10. For instance, the distributed server devices 1020 may each comprise a processing component 1030 and a communications component 1040 which are the same or similar to the processing component 730 and the communications component 740, respectively, as described with reference to FIG. 7. In another example, the distributed server devices 1020 may communicate over a communications media 1012 using communications signals 1014 via the communications components 1040.

The distributed server devices 1020 may comprise or employ one or more server programs that operate to perform various methodologies in accordance with the described embodiments. In one embodiment, for example, the distributed server devices 1020 may each execute one of a plurality of messaging servers 1050. The messaging servers 1050 may comprise messaging servers for a messaging system 110. The messaging servers 1050 may provide messaging operations for a plurality of client devices 1010, receiving and sending messages between the client devices 1010. The client devices 1010 may correspond to one or more of a smartphone device 150, tablet device 160, personal computer device 180, and/or any other client device.

Figure 11:
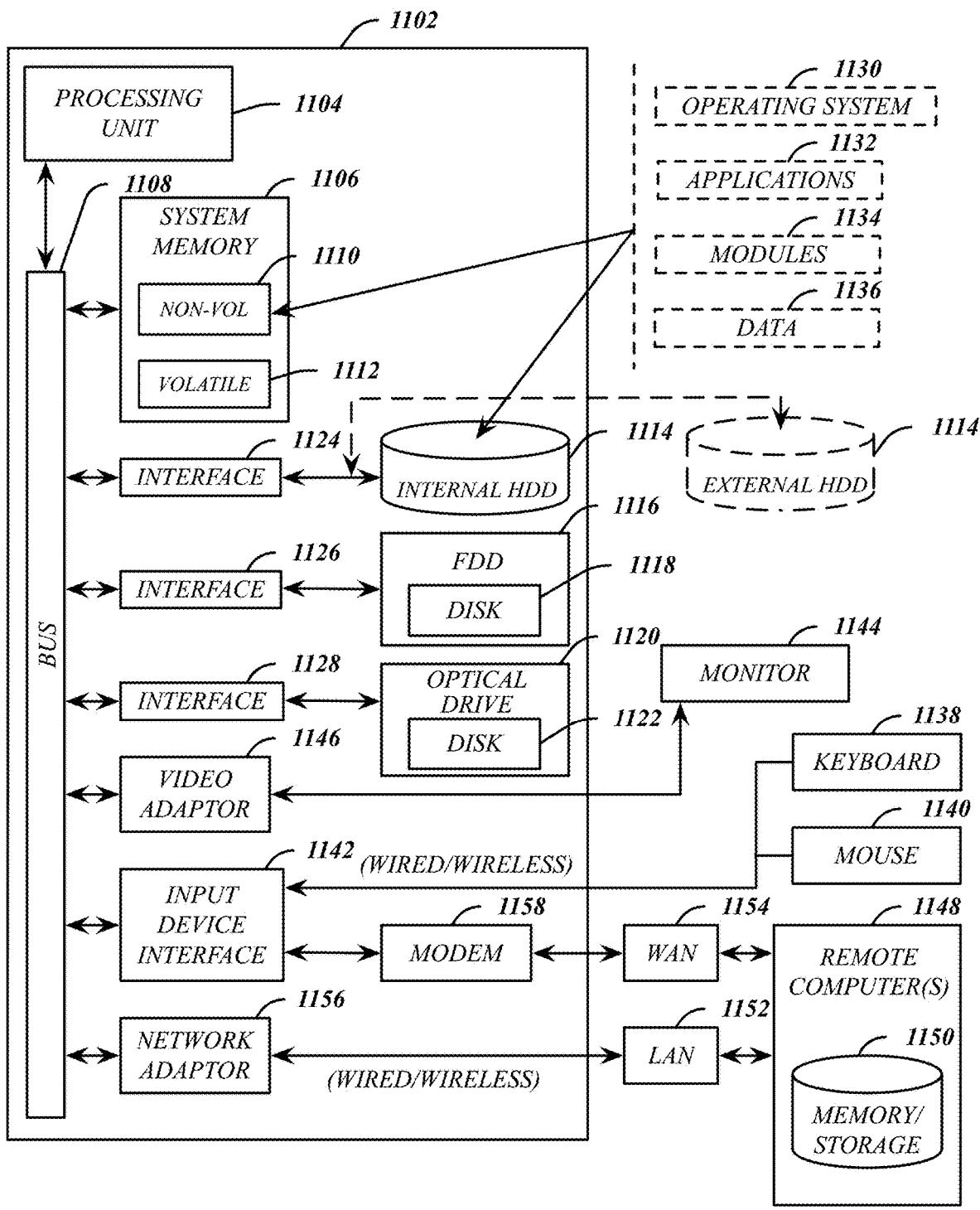
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 9, 10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the templated-message system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
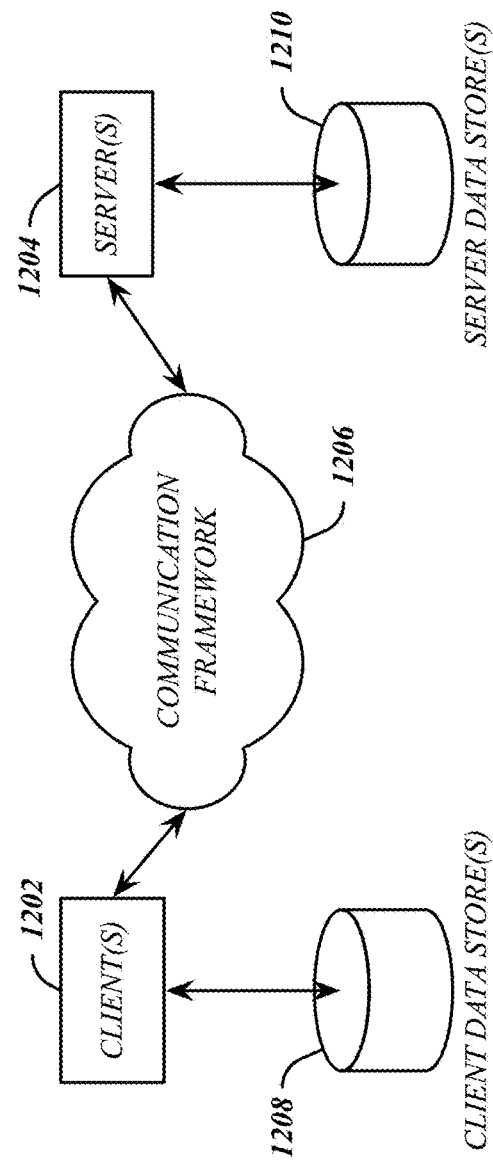
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
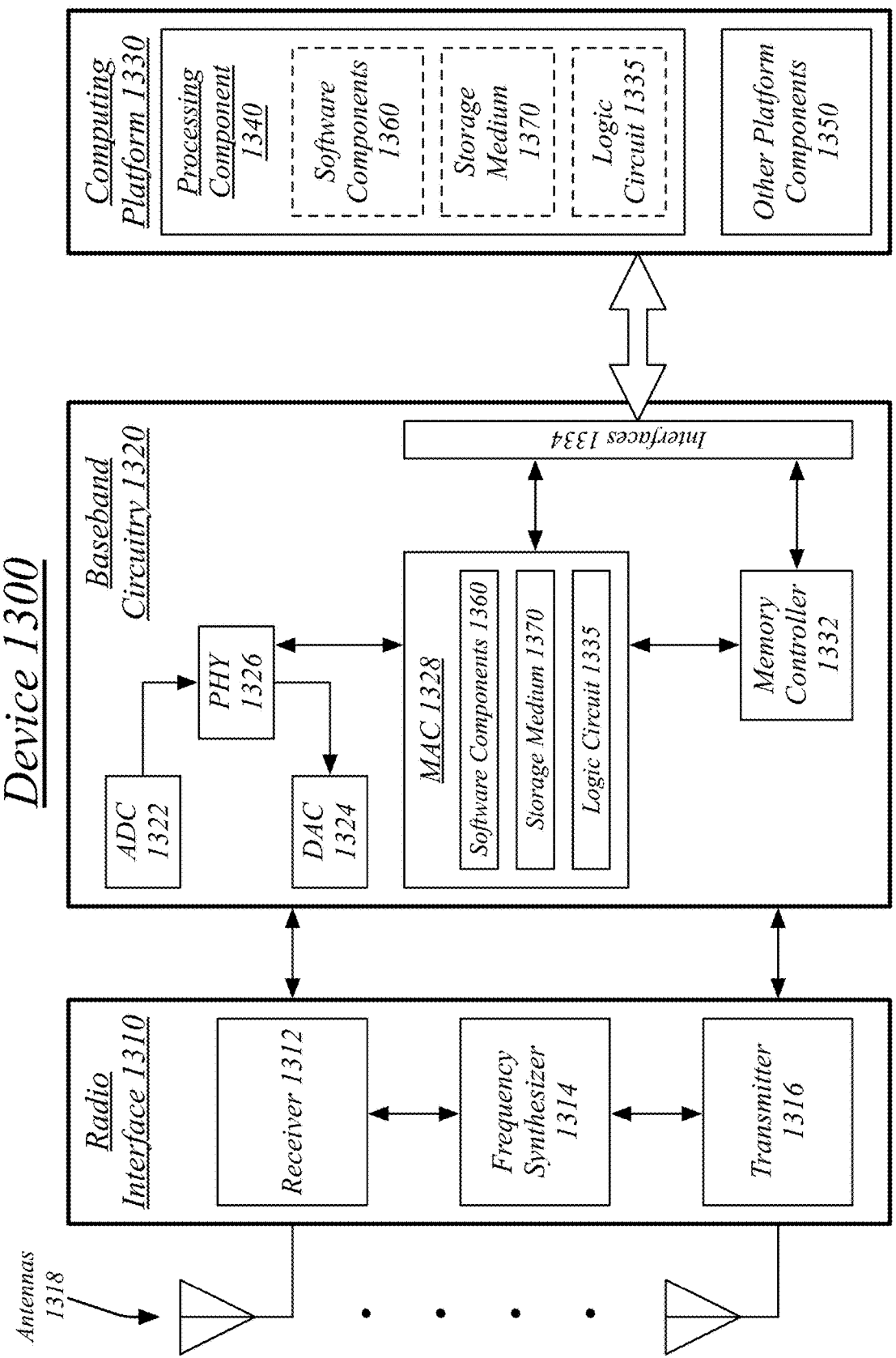
FIG. 13 illustrates an embodiment of a radio device architecture.

FIG. 13 illustrates an embodiment of a device 1300 for use in a multicarrier OFDM system, such as the templated-message system 100. Device 1300 may implement, for example, software components 1360 as described with reference to templated-message system 100 and/or a logic circuit 1335. The logic circuit 1335 may include physical circuits to perform operations described for the templated-message system 100. As shown in FIG. 13, device 1300 may include a radio interface 1310, baseband circuitry 1320, and computing platform 1330, although embodiments are not limited to this configuration.

The device 1300 may implement some or all of the structure and/or operations for the templated-message system 100 and/or logic circuit 1335 in a single computing entity, such as entirely within a single device. Alternatively, the device 1300 may distribute portions of the structure and/or operations for the templated-message system 100 and/or logic circuit 1335 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for the templated-message system 100 and logic circuit 1335 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 1302.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a templated-message package at a client, the templated-message package comprising a message-template identifier and one or more parameters; retrieving a message template based on the message-template identifier; generating a templated message based on the retrieved message template and the one or more parameters; and displaying the templated message in the client.

A computer-implemented method may further comprise the templated-message package comprising a template-namespace identifier, further comprising: determining that the message template is not resident on the client device; sending a template-pack request to a template server, the template-pack request comprising the template-namespace identifier; receiving a template pack in response to the template-pack request from the template server; and retrieving the message template from the template pack based on the message-template identifier.

A computer-implemented method may further comprise the client associated with a preferred-language setting, the preferred-language setting comprising one or more preferred languages, the template pack request comprising the preferred-language setting, the received template pack comprising two or more message templates using one of the one or more preferred languages.

A computer-implemented method may further comprise the one or more parameters comprising a localized parameter, the localized parameter comprising one of a currency parameter, a date parameter, and a time parameter, wherein the localized parameter is translated to a region-specific localization.

A computer-implemented method may further comprise the templated-message package sent by an enterprise entity, the enterprise entity identified by a phone number, further comprising: receiving a verified-name package from a messaging system identifying a verified-name for the enterprise entity based on the phone number.

A computer-implemented method may further comprise the templated-message package received in response to a communication initiation by the client, the communication initiation initiated based on a resource indicator comprising the phone number for the enterprise entity.

A computer-implemented method may further comprise the templated-message package comprising one or more prefilled responses, wherein each of the one or more prefilled responses corresponds to a prefilled-response identifier, further comprising: displaying the one or more prefilled responses in the client; receiving a prefilled-response selection; and responding to the templated-message package with a prefilled-response package, the prefilled-response package comprising the message-template identifier and the prefilled-response identifier for the prefilled response selection.

An apparatus may comprise a messaging component operative to receive a templated-message package at a client, the templated-message package comprising a message-template identifier and one or more parameters; retrieve a message template based on the message-template identifier; and generate a templated message based on the retrieved message template and the one or more parameters; and a user interface component operative to display the templated message in the client. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    sending a templated-message package comprising a template-namespace identifier identifying a template pack and a message-template identifier identifying a specific message template from the template pack to a client device;
    receiving, from the client device, a template-pack request comprising the template-namespace identifier and a localization identifier;
    creating a localized template pack by localizing a plurality of message templates in the template pack identified by the template-namespace identifier in accordance with the localization identifier; and
    sending the localized template pack to the client device;
    wherein each of the plurality of message templates in the localized template pack comprises one or more parameters, wherein at least one of the one or more parameters is a region-specific localization parameter specifying a region-specific localization, the plurality of message templates being localized using a value for each region-specific localization parameter selected based on the received localization identifier; and
    wherein each of the region-specific localization parameters comprises one or more of a currency parameter, a date parameter and a time parameter.

2. The method of claim 1, the template-pack request comprising a preferred-language setting, the localized template pack sent to the client device comprising the plurality of message templates using a preferred language indicated by the preferred-language setting.

3. The method of claim 1, each of the plurality of message templates in the template pack comprising one or more prefilled responses for user selection, further comprising:
    receiving a prefilled-response package comprising the message-template identifier and a prefilled-response identifier for a user-selected prefilled response.

4. The method of claim 3, the templated-message package received from an enterprise entity, further comprising:
    forwarding the received prefilled-response package to the enterprise entity.

5. The method of claim 4, the templated-message package received from the enterprise entity in response to a communication initiation by the client device, the communication initiation initiated based on a resource indicator comprising an identifier for the enterprise entity.

6. A system comprising:
    a processor; and
    a memory, coupled to the processor, the memory containing instructions that, when executed by the processor, cause the system to:
    send a templated-message package comprising a template-namespace identifier identifying a template pack and a message-template identifier identifying a specific message template from the template pack to a client device;
    receive, from the client device, a template-pack request comprising the template-namespace identifier and a localization identifier;
    create a localized template pack by localizing a plurality of message templates in the template pack identified by the template-namespace identifier in accordance with the localization identifier; and
    send the localized template pack to the client device;
    wherein each of the plurality of message templates in the localized template pack comprises one or more parameters, wherein at least one of the one or more parameters is a region-specific localization parameter specifying a region-specific localization, the plurality of message templates being localized using a value for each region-specific localization parameter selected based on the received localization identifier; and wherein each of the region-specific localization parameters comprises one or more of a currency parameter, a date parameter and a time parameter.

7. The system of claim 6, the template-pack request comprising a preferred-language setting, the localized template pack sent to the client device comprising the plurality of message templates using a preferred language indicated by the preferred language setting.

8. The system of claim 6, each of the plurality of message templates in the template pack comprising one or more prefilled responses for user selection, the instructions further causing the system to:
receive a prefilled-response package comprising the message-template identifier and a prefilled-response identifier for a user-selected prefilled response.

9. The system of claim 8, the templated-message package received from an enterprise entity, the instructions further causing the system to: forward the received prefilled-response package to the enterprise entity.

10. The system of claim 9, the templated-message package received from the enterprise entity in response to a communication initiation by the client device, the communication initiation initiated based on a resource indicator comprising an identifier for the enterprise entity.

11. A non-transitory, computer-readable medium containing instructions that, when executed by a processor, cause the processor to:
send a templated-message package comprising a template-namespace identifier identifying a template pack and a message-template identifier identifying a specific message template from the template pack to a client device;
receive, from the client device, a template-pack request comprising the template-namespace identifier and a localization identifier;
create a localized template pack by localizing a plurality of message templates in the template pack identified by the template-namespace identifier in accordance with the localization identifier; and
send the localized template pack to the client device;
wherein each of the plurality of message templates in the localized template pack comprises one or more parameters, wherein at least one of the one or more parameters is a region-specific localization parameter specifying a region-specific localization, the plurality of message templates being localized using a value for each region-specific localization parameter selected based on the received localization identifier; and
wherein each of the region-specific localization parameters comprises one or more of a currency parameter, a date parameter and a time parameter.

12. The medium of claim 11, the template-pack request comprising a preferred-language setting, the localized template pack sent to the client device comprising the plurality of message templates using a preferred language indicated by the preferred-language setting.

13. The medium of claim 11, each of the plurality of message templates in the template pack comprising one or more prefilled responses for user selection, the instructions further causing the processor to:
receive a prefilled-response package comprising the message-template identifier and a prefilled-response identifier for a user-selected prefilled response.

14. The medium of claim 13, the templated-message package received from an enterprise entity in response to a communication initiation by the client device, the communication initiation initiated based on a resource indicator comprising an identifier for the enterprise entity, the instructions further causing the processor to:
forward the received prefilled-response package to the enterprise entity.

\* \* \* \* \*